(12) United States Patent
Roberts

(10) Patent No.: US 6,370,945 B2
(45) Date of Patent: *Apr. 16, 2002

(54) LEAK MONITORING SYSTEM

(75) Inventor: Michael Lee Roberts, 252 Portview Road, Port Perry Ontario (CA), L9L 1B4

(73) Assignee: Michael Lee Roberts, Port Perry (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/137,414

(22) Filed: Aug. 20, 1998

(51) Int. Cl.[7] ........................... G01M 3/04; G01M 3/08; G01R 31/26
(52) U.S. Cl. ...................... 73/49.5; 73/40.5 R; 324/694
(58) Field of Search ................. 73/40.5 R, 49.5, 73/49.1; 324/694, 663; 340/603; 138/104

(56) References Cited

U.S. PATENT DOCUMENTS

| 17,635 A | 6/1857 | Pierce |
| 209,103 A | 10/1878 | Austin |
| 1,303,102 A | 5/1919 | Monrath |
| 2,606,574 A | 8/1952 | Lefebvre |
| 2,944,298 A | 7/1960 | Bernhardt et al. |
| 2,978,350 A | 4/1961 | Wilson |
| 2,998,800 A | 9/1961 | Vernooy |
| 3,096,478 A | 7/1963 | Brown |
| 3,235,290 A | 2/1966 | Young |
| 3,281,308 A | 10/1966 | D'Asto |
| 3,866,114 A | 2/1975 | Johnston |
| 3,882,382 A | * 5/1975 | Johnson ...................... 324/694 |
| 4,338,879 A | 7/1982 | Makeev et al. |
| 4,589,275 A | * 5/1986 | Thomas et al. .......... 73/40.5 R |
| 4,692,752 A | * 9/1987 | Abel .......................... 340/603 |
| 5,203,202 A | * 4/1993 | Spencer .................... 73/40.5 R |
| 5,301,984 A | 4/1994 | Farris |
| 5,321,367 A | * 6/1994 | Koscica et al. ............. 324/663 |
| 5,551,484 A | * 9/1996 | Charboneau ................ 138/125 |

FOREIGN PATENT DOCUMENTS

CA 832395 1/1970

* cited by examiner

Primary Examiner—Hezron Williams
Assistant Examiner—Jay L. Politzer
(74) Attorney, Agent, or Firm—Bereskin & Parr

(57) ABSTRACT

The invention provides a leak detection system comprising a conduit for carrying a fluid or gas and a control device for monitoring leaks in the conduit. The conduit is formed from first and second electrically conductive layers that are electrically insulated from each other. The control device includes an output, for introducing an electric charge to the first and second layers, a detector for detecting changes in the electric charge introduced to layers, and a response switch for triggering a predetermined response when a sufficient change in the electric charge is detected.

7 Claims, 15 Drawing Sheets

LEAK MONITORING SYSTEM

FIELD OF THE INVENTION

The present invention relates to a system for monitoring leaks in conduits and containers. In particular, the invention relates to the electronic monitoring of leaks in gas venting systems, fluid piping systems, heat exchangers, fluid storage or processing tanks or other conduits and containers due to corrosion penetration or joint separation.

BACKGROUND OF INVENTION

As homes and buildings become more air tight, there has become a need to insure that the exhaust vents of natural gas, propane, and oil fired heating appliances, hot water heaters, and boilers have not separated or corroded to the point that harmful flue gases are allowed to escape inside of structures rather than being exhausted outside of the structure. The escape of flue gas can expose the occupants of the structure to carbon monoxide and other hazardous gases found in flue gases. With less fresh air entering the structure, there is a greater risk of harmful gases concentrating inside of the structure.

In order for the appliance to fail safe in the case of vent deterioration, there must be a device that can detect the leak and interrupt the ability of the appliance to fire or run while the unsafe condition exists. There is government pressure being brought upon appliance manufacturers and the heating industry to require that control systems be incorporated into appliances as part of the future certification process. Many deaths have been attributed to conduit deterioration or joint separations.

When the conduit or container is being used to conduct or contain acidic, caustic, radioactive or hazardous liquids, it is also important to have the means to detect a leak and sound an alarm and/or prevent the pump from continuing to deliver the liquid into a deteriorated pipe system or a system in which the joints have separated. The continued flow of liquid though a deteriorated or separated piping system can cause bodily harm and/or physical property damage.

Previous control systems for power assisted venting products have relied on the ability of the control system to detect changes in the negative air pressure of the interior of a vent system. This is sometimes inaccurate due to the fact that there are endless potential configurations with different lengths and numbers of bends and elbows which will significantly influence the negative air pressure within a vent system. When the configuration variables are combined with pressure variables caused by changing barometric pressures, changing wind directions and wind speeds, pressure sensors can detect many false or confusing readings causing nuisance shut downs.

There is a need for a reliable, inexpensive, and simple system to detect conduit failures which is not prone to false readings leading to wasteful equipment shut downs.

SUMMARY OF THE INVENTION

The present invention provides for multiple layers of electrically conductive and electrically insulating materials which would be isolated from each other as long as there is no deterioration or penetration of the wall of the conduit or container. Should there be a corrosion penetration of the wall of the conduit or container caused by flue gas condensate or corrosive fluid, the condensate or liquid would act as a conductor to allow increased electrical current to pass from one electrically conductive layer to another electrically conductive layer. The increased conductance will change the electrical resistance of the overall system, change the electrical capacitance of the system, or result in a direct circuit if the voltage is high enough and the fluid has a low enough resistance to allow sufficient current to flow between the two conductive layers. The change in electrical resistance or capacitance can be measured and a signal can be conveyed to a control device to stop operation of the equipment and/or sound an alarm.

Changes in electrical capacitance and resistance of the system are evident in the case of full and partial corrosion penetration of the insulating layer between the electrically conductive layers. Where condensate has only partially penetrated into the insulative layer, small changes in resistance and conductance will result. A higher level of sensitivity will be required to detect such changes but will nonetheless allow the system to detect an impending fault. In contrast, when full corrosion penetration has occurred or when a pipe joint has completely separated, much larger changes in resistance and conductance will result necessitating less sensitive detection.

Alternatively, the completed circuit can blow an electrical fuse and interrupt the supply of electrical current to the equipment and/or sound an alarm.

Presently most venting and pipe systems use a single material such as metal or plastic to form pipe lengths and joint elbows. Using an electrical current to monitor the integrity of such a system is not possible because there is not a second conductive layer to create electrical capacitance which can be used for detection purposes in the event that there is a corrosion penetration of the walls of the pipe. In order to create electrical capacitance, there must be two or more layers of electrically conductive plates or coating layers which are separated by an insulator layer.

In one aspect, the invention provides a leak detection system comprising a leak detection system comprising:
  a conduit for conducting a fluid or gas, said conduit being defined along its length by first and second layers of an electrically conductive material, said first and second layers being electrically insulated from each other;
  means for electrically insulating said conduit from input and output connection members;
  control means for detecting a leak in said conduit, said control means including output means for introducing an electric charge to said first or second conductive layers of said conduit, detector means for detecting changes in said electric charge in said first and second conductive layers, and response means for triggering a predetermined response when a sufficient change in said electric charge is detected.

In another aspect, the invention provides a leak detection system comprising a leak detection system comprising:
  a conduit for conducting a fluid or gas, said conduit including means for carrying an electric charge along the entire length of said conduit;
  means for electrically isolating said conduit from input and output connection members;
  means for connecting the ends of said conduit to a power source for actuating said fluid or gas flow, wherein said conduit forms part of a circuit with said power source, and wherein a separation of one or more of said conduit sections will interrupt the flow of current in said circuit and cause said power source to deactivate said fluid or gas flow. dr

DETAILED DESCRIPTION OF THE PREFERRED EMBODIMENT

Figure 1:
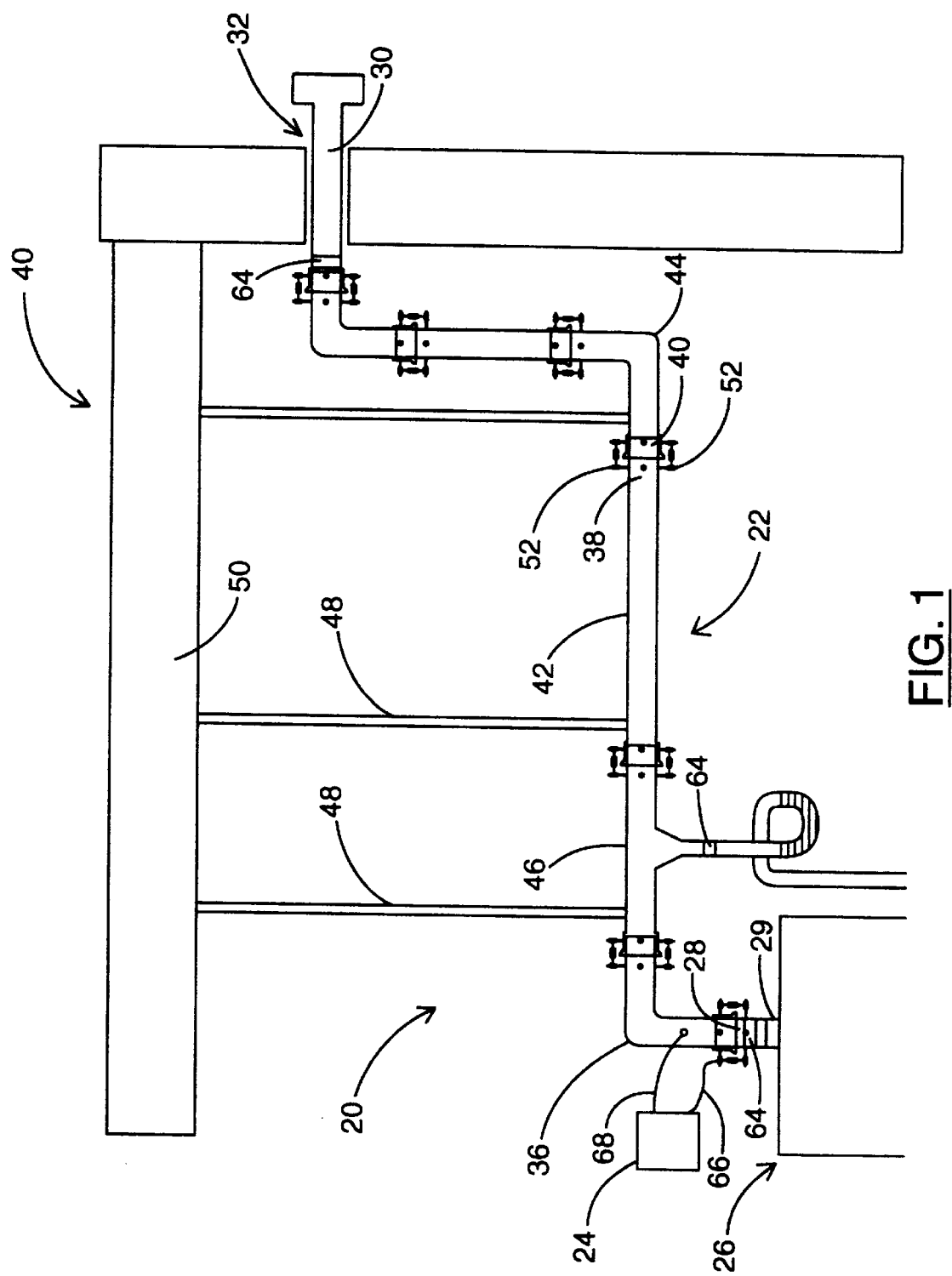
FIG. 1 is a side view of a leak detection system in accordance with the present invention.
Figure 2:
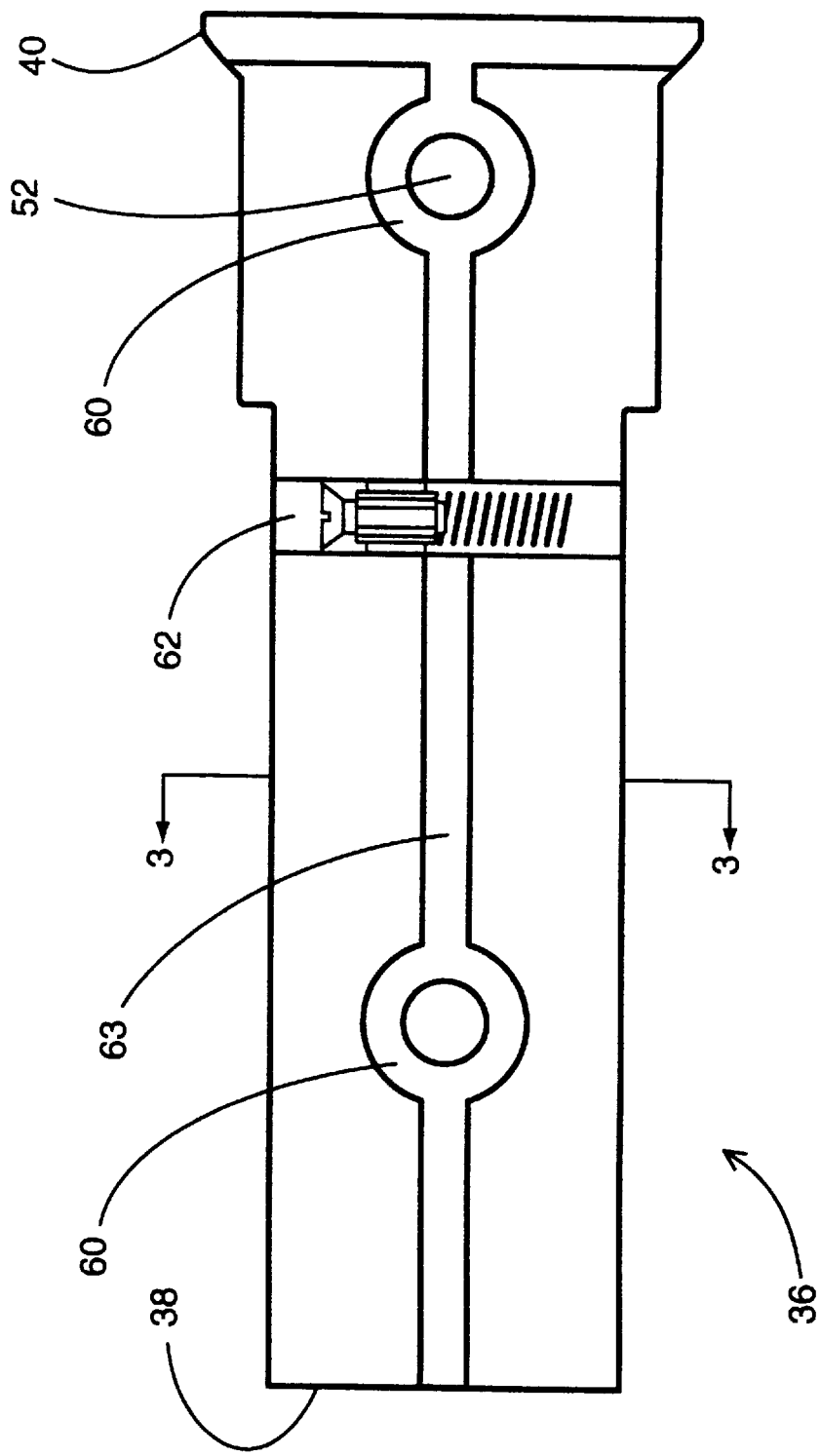
FIG. 2 is a plan view of a conduit section for the leak detection system of FIG. 1.
Figure 3:
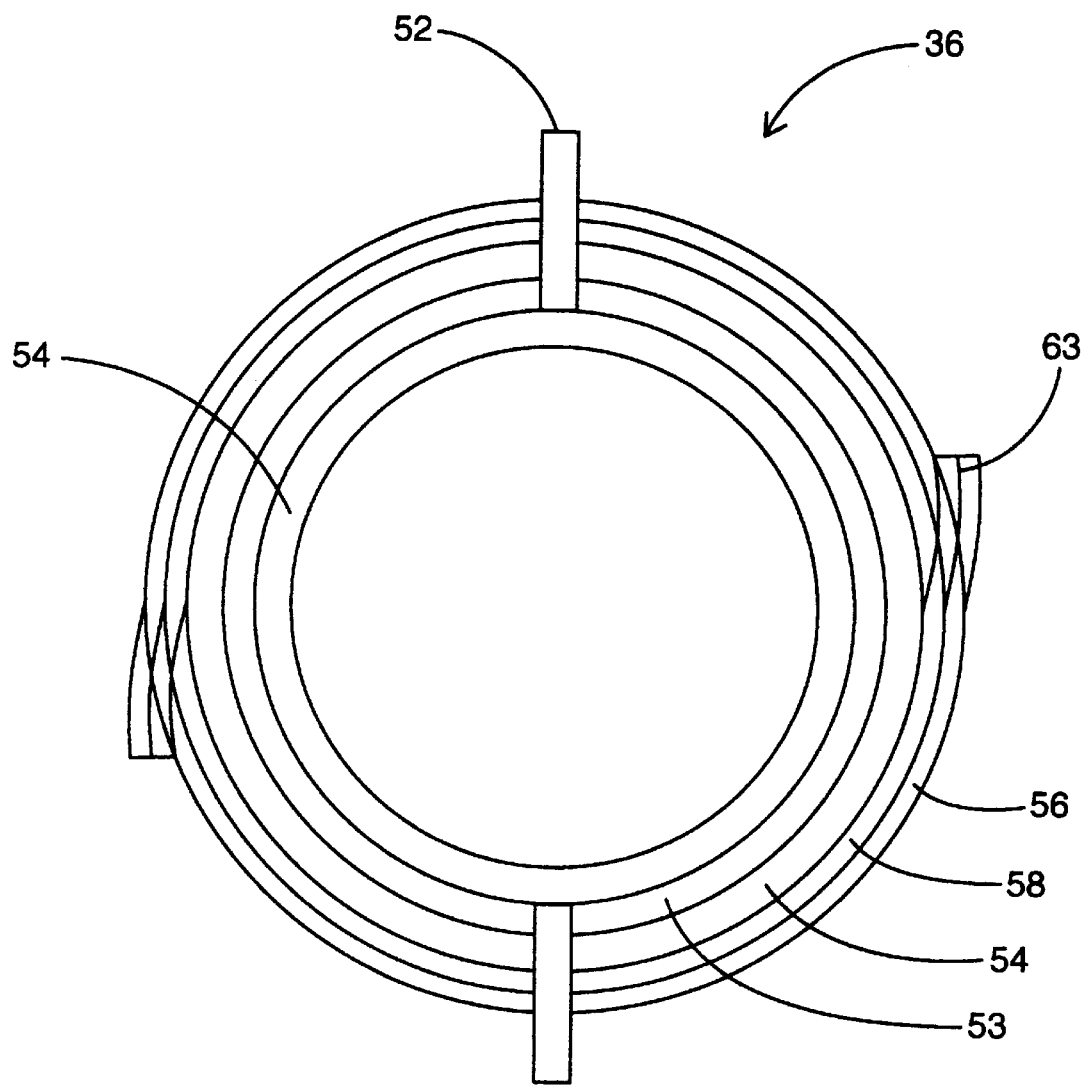
FIG. 3 is a sectional view of the conduit section of FIG. 2, taken along lines 3—3.

A leak detection system in accordance with the present invention is depicted generally at 20 in FIG. 1. The system comprises a conduit 22 for carrying a fluid or a gas and a control device 24 for monitoring leaks in the conduit 22.

The conduit 22 depicted in FIG. 1 is for venting gases from a heating appliance 26 such as a furnace, water heater or boiler. One end of the conduit 22 is connected to an adapter 28 that is in turn fitted to a flue gas output 29 for the heating appliance 26. The other end of the conduit 22 is connected to a wall thimble 30 that is disposed within a side wall 32 of a building 34 for discharging the flue gas to the outdoors.

The conduit 22 depicted in FIG. 1 comprises a plurality of sections 36 having male and female ends 38 and 40 that are interconnected to define a sealed system. The conduit sections 36 each include radial welded studs 52 at the respective male and female ends 38, 40 to facilitate connecting the conduit sections 36 together physically and electronically as described below. The conduit sections 36 include straight sections 42 and elbow sections 44. A condensate T-section 46 is also provided to allow accumulations of condensate to be removed from the venting system as known in the art. The conduit sections 36 are suspended from hangar straps 48 that loop under the conduit sections 36 and connect to an upper support member 50 such as the subfloor of the building 34.

In the embodiment depicted in FIGS. 1-5, the conduit sections 36 each comprise a 16 gauge welded steel tube that serves as a first conductive layer 53 for carrying an electric charge as described further below.

The conduit sections 36 are coated on the inside and outside with a protective acid resistant insulator layer 54 such as glass, plastisol, flouroelastomere or any other suitable non-electrically conductive and protective coating. This coating is preferably applied by dipping or controlled spraying of the conduit sections 36 with the desired insulator material 54.

A second conductive layer 56 is disposed to the interior or exterior of the conduit sections 36 over the insulator layer 54. It is important that the second conductive layer 56 does not come into contact with the first conductive layer 53 of the conduit sections 36 to avoid a short circuit.

The second conductive layer 56 depicted in FIG. 1 is a metallic foil (preferably aluminum) that has been applied using an adhesive 58 to the exterior of the conduit section 36. Openings 60 are cut in the foil 56 to avoid making electrical contact (i.e. a short circuit) with the welded studs 52 which are connected to the electrically conductive first layer 53. A circular metal clamp 62 is placed on the exterior of the conduit section 36 to ensure that the second layer 56 is one continuous conductor about its circumference. Since the adhesive layer 58 can act as an insulator, the area where the foil layers overlap (shown at 63 in FIG. 3) may not provide a good electrical contact point so that the entire circumference of the conduit 22 is a continuous circuit. Accordingly, an electrically conductive and adhesive material 59 (such as an epoxy or high temperature silicone) can serve to bridge the electrical contact between the overlapping portions of the second conductive layer 56.

Instead of a metallic foil, the second conductive layer 56 can be made of another electrically conductive coating such as an aluminum, copper, silver, or zinc filled paint, a graphite filled flouroelastomere, or an electrically conductive plastic or epoxy. If constructing the second conductive layer 56 out of a coating, the welded studs 52 must be masked off prior to applying the coating to avoid making an electrical contact with the electrically conductive first layer 53.

Figure 4:
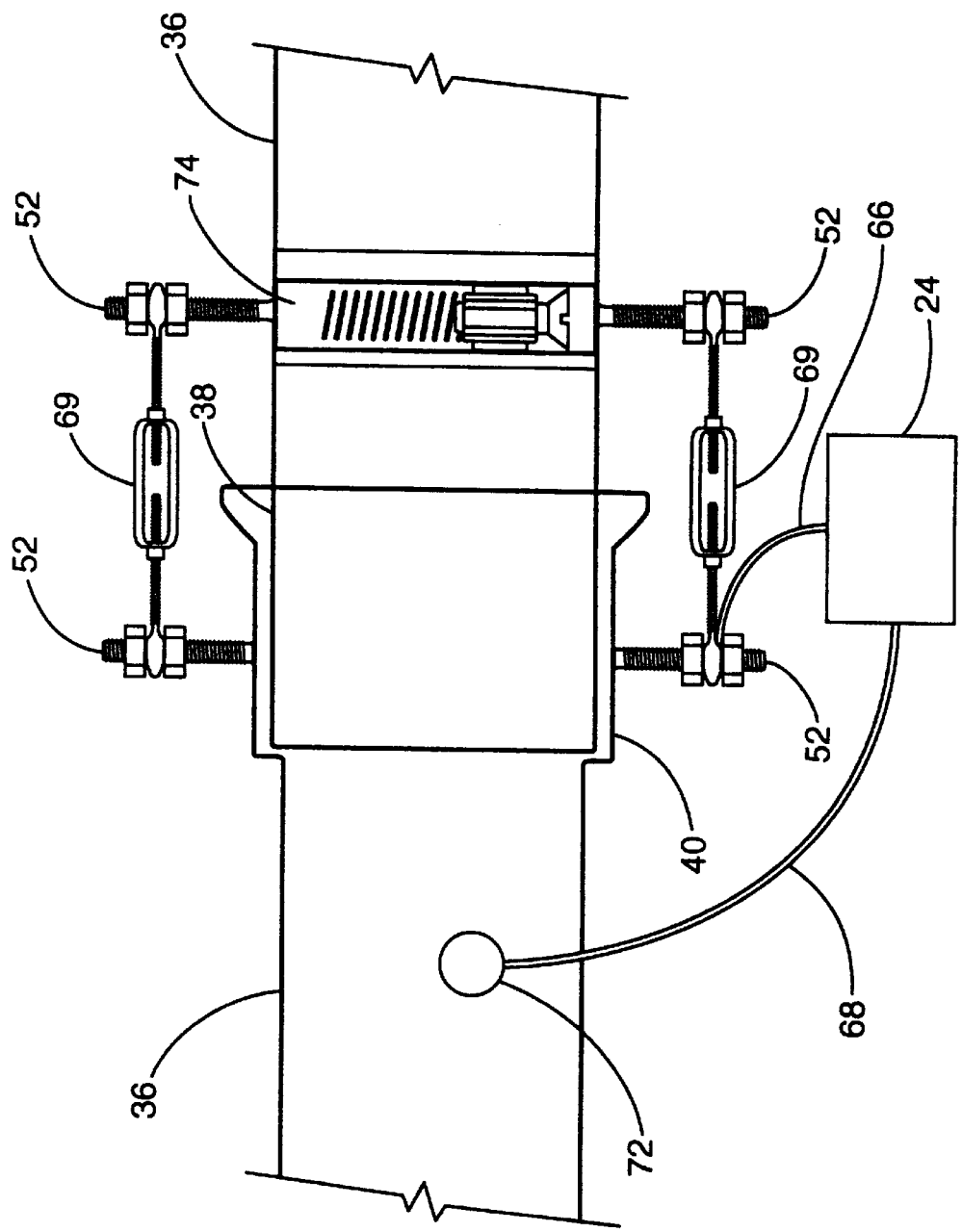
FIG. 4 is an enlarged view of the connection between the appliance adapter and conduit section for the leak detection system of FIG. 1.
Figure 5:
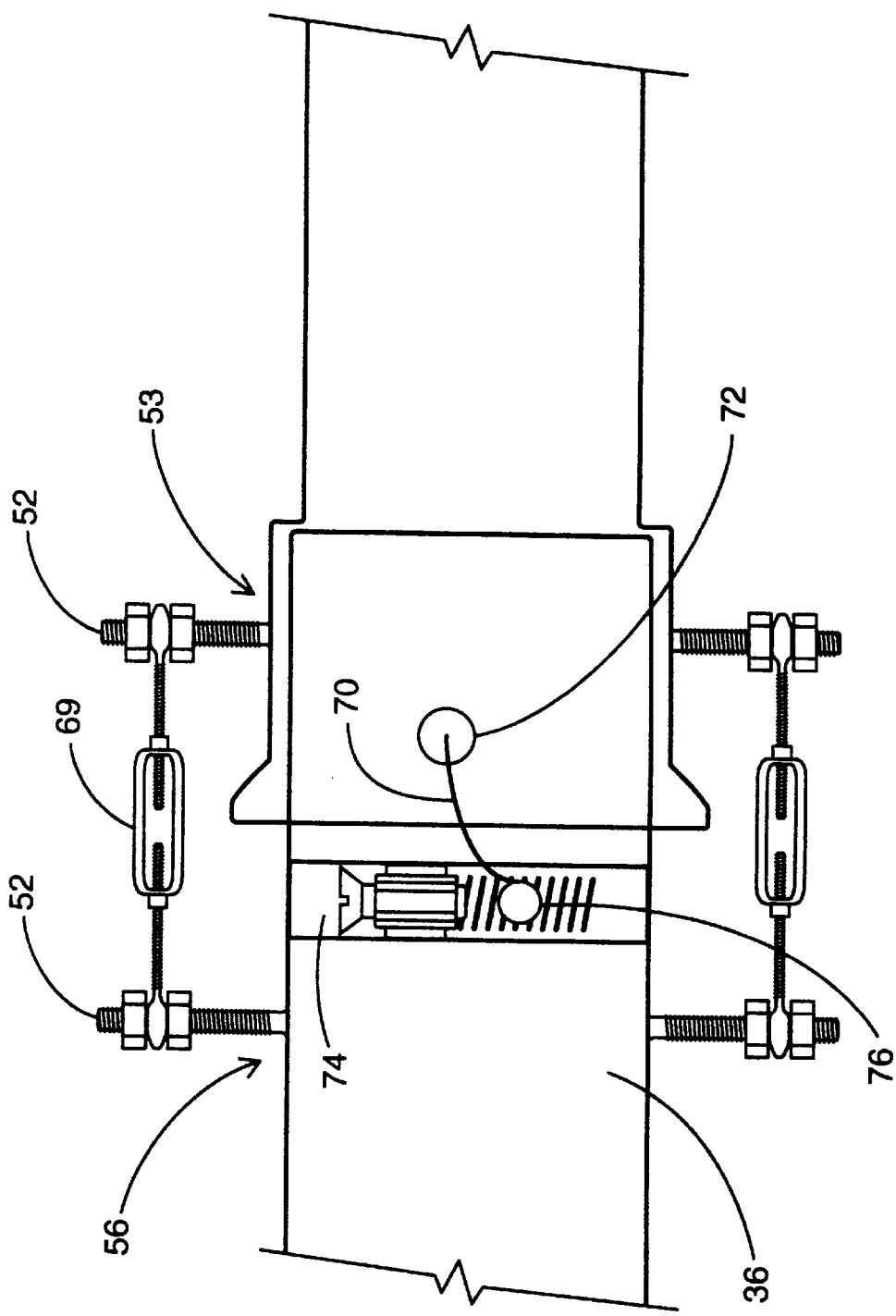
FIG. 5 is an enlarged view of an alternate connection between adjacent conduit sections for the leak detection system of FIG. 1.

Referring to FIGS. 4 and 5, the conduit sections 36 are drawn together by metal turn buckles 69 which are attached to the studs 52 that have been welded to the first conductive layer 53 of the conduit 22. The turn buckles 69 mechanically secure the individual conduit sections 36 together to create a gas or fluid tight seal. Since the first conductive layer 53, welded studs 52, and turn buckles 69 are all made of metal and are electrically conductive they form an electrical circuit along the entire length of the conduit 22 from the appliance adapter 28 to the wall thimble 30.

The second conductive layer 56 located on the exterior of the individual conduit sections 36 must also be joined together to form an electrical circuit along the entire length of the conduit 22. This is accomplished by attaching an electrically conductive wire 70 to the second conductive layers 56 of adjacent conduit sections 36 by means of an electrically conductive epoxy 72 or a metal clamp 74 with a solderless crimp connector 76 which is riveted to the clamp band 74.

The appliance adapter 28, condensate T-section 46 and wall thimble 30 are all electrically insulated from the conduit 22 by means of a rubber or plastic insulating ring 64 so that the conduit 22 is a free floating circuit.

The control device 24 is located at the end of the conduit 22 closest to the appliance. Alternatively, the control device 24 may be incorporated into the main control device for the appliance itself. A first insulated wire 66 originating from the control device 24 is electrically connected to the first conductive layer 53 of the conduit 22 and a second insulated wire 68 also originating from the control device 24 is electrically connected to the second conductive layer 56 of the conduit 22. Power is supplied to the control device 24 by electrical connection to the appliance power source. Accordingly, as described below, a voltage signal may be applied across the first and second conductive layers 53 and 56 and the change in the voltage signal therebetween may be monitored by the control device 24.

The electronic control device 24 is designed to monitor the capacitance of the installed conduit 22. In order to create electrical capacitance there must be two or more electrically conductive layers 53 and 56 which are separated by an insulator layer 54. The metal substrate and the metallic foil serve as the first and second electrically conductive layers 53 and 56 for the specific embodiment depicted in FIG. 1. The glass coating serves as the insulator layer 54. The control device 24 can be used to adjust the amplitude of the voltage signal generated by the conduit 22 after it is installed. The ability of the control device 24 to monitor each unique installed conduit 22 is important due to the fact that the final installed system 20 is comprised of a wide variety of individual conduit sections 36 which have many different lengths and configurations.

In order to monitor the conduit 22 for corrosion penetration or a disconnection of a joint, the control device 24 is designed to sense any change in capacitance. Alternatively, the control device 24 can measure and react to a change of electrical resistance of the conduit 22.

If a joint becomes disconnected the overall capacitance of the conduit will change since the sections 36 are functioning as capacitors connected in parallel. The electronic control device 24 will detect such changes in capacitance and/or resistance and cause the appliance to fail safely.

For any corrosion to penetrate the wall of the conduit 22 there must be acidic condensate forming which is part of the combustion process when any fossil fuel is burned. In order to have a wall penetration which would allow harmful flue gasses to escape into the occupied area of a building 34 the corrosion must penetrate all four layers of materials which collectively form the wall of the conduit 22. In the event that such corrosion occurs, acidic condensate must be present in the effected area. The first layer of the conduit 22 is a protective insulating layer 54. If corrosive condensate penetrates this layer 54 it will then begin to attack the next layer which is the first conductive layer 53. This layer 53 is charged with an electrical charge by the control device 24. If the corrosive condensate penetrates the first conductive layer 53 it will next begin to continue to penetrate the insulator layer 54 until it finally reaches the fourth layer which is the exterior electrically conductive layer 56.

At this point the condensate, which must be present for corrosion to have occurred in the first place, will be in direct contact with both the first conductive layer 53 and the outside conductive layer 56. Since the condensate is acidic, it will act as an electrolyte and permit current to pass between the two electrically conductive layers 53 and 56.

The increase of conductance within this capacitive element of the circuit will alter the electrical resistance, inductance and capacitance of the complete installed vent system and will be detected by the control device 24. The sensitivity of the control device will determine when the corrosion is detected. The control device 24 will then interrupt the thermostat or other controlling device which gives the command to the appliance to come on and burn fuel. Alternatively, the control device 24 will interrupt the power to the gas control valve or any other essential component to the ongoing operation of the appliance. This interruption will insure that if a corrosion penetration or joint separation occurs that the appliance will not operate and will fail safely.

Changes in electrical capacitance and resistance of the system are evident in the case of full and partial corrosion penetration of the insulating layer 54 between the electrically conductive layers 53 and 56. Where condensate has only partially penetrated into the insulator layer 54, small changes in capacitance will result. Even so, the penetration of the condensate partway into the insulating layer 54 can result in a detectable change in the dielectric properties of the insulating layer 54 which correspondingly affect the system's capacitance and resistance values. A higher level of sensitivity will be required to detect such changes but will nonetheless allow the system to detect an impending fault. In contrast, when full corrosion penetration has occurred or when a pipe joint has completely separated from conduit 22, much small changes in capacitance will result necessitating less sensitive detection.

Figure 6:
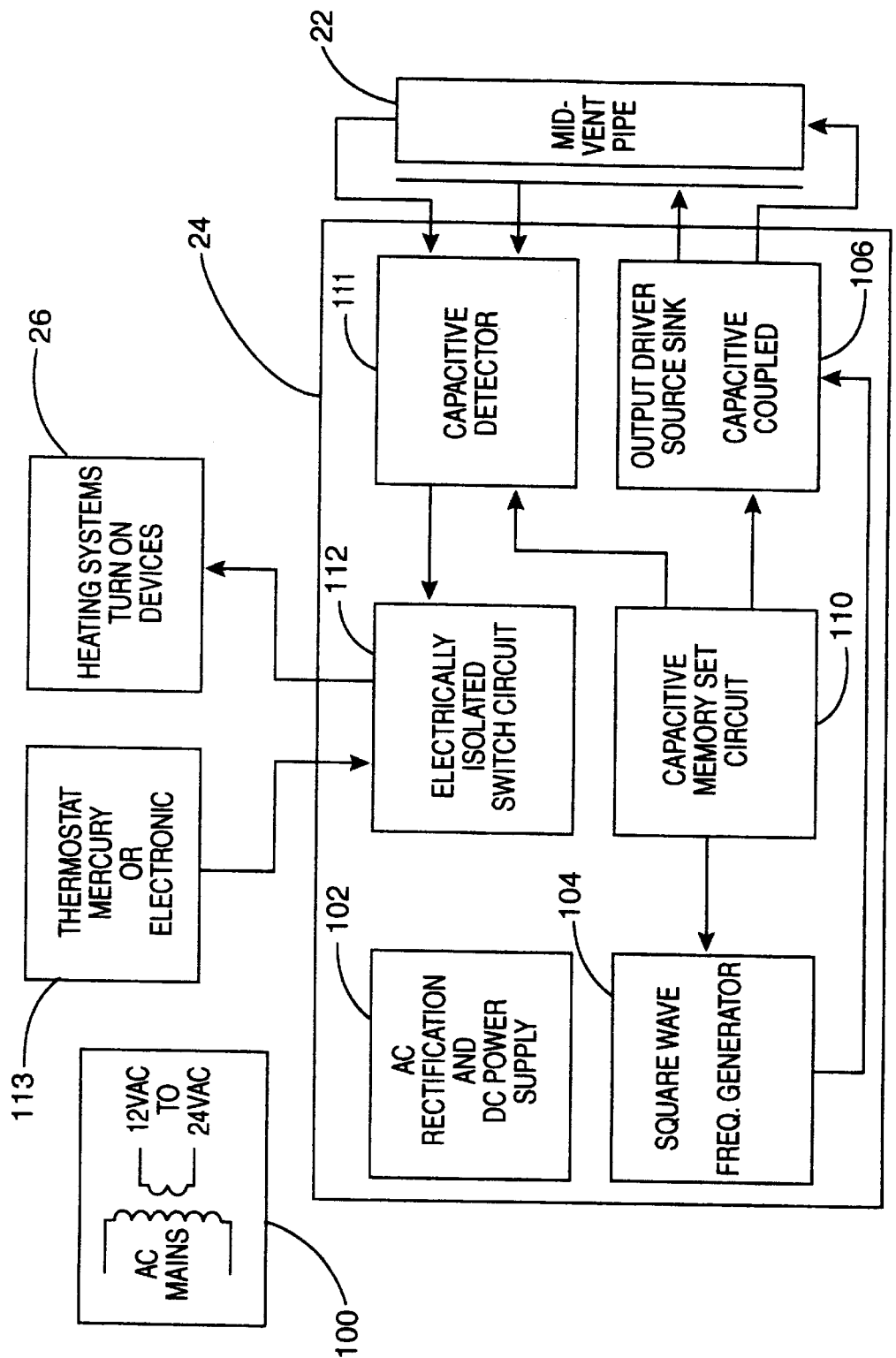
FIG. 6 is a block diagram of a leak detection system in accordance with the present invention.

Referring to FIG. 6, an electrical block diagram of the leak detection system 20 is shown. The system is connected to a power source comprising a low voltage electrical transformer 100 that is located in the appliance 26 which is to be vented. In the event the control device 24 is being used to monitor a pluming system, a separate transformer must be supplied. This power source is 24 volt AC. The transformer 100 provides power to an AC rectifier 102 located in the control device 24 which converts the electrical power from AC to DC and then powers all electronic circuitry within the control device 24. A frequency generator 104 located within the control device 24 then generates a square wave voltage signal which is sent to an output driver 106 which transfers the square wave voltage signal into the conduit 22 which is to be monitored. The spaced conductive layers 53 and 56 of the conduit 22 then act to convert the square wave voltage signal into an approximate triangular wave voltage signal having a slope which is dependent on the time constant of the equivalent RC circuit for the conduit 22, as is conventionally known.

The control device 24 is equipped with a capacitance detector circuit 108 which is designed to measure a specific peak to peak or amplitude value. Since the capacitance of the conduit 22 would vary from one installation or application to the other, the electronic wave signal must be adjusted so that the amplitude matches a range or 'safe window' designed into the capacitance detector.

A potentiometer 110 located in the control device 24 allows the peak to peak value or amplitude of the triangular wave voltage signal to be adjusted to a predetermined value such that it falls within a preset 'safe range'. The detector sends a signal to an electrically isolated switch 112 located in the control device 24. Upon receiving the signal, electrically isolated switch 112 will complete the circuit between the thermostat 113 and the appliance 26. With the circuit completed, the thermostat and appliance will function as originally designed.

In the event that the amplitude of the triangular electronic wave exceeds the preset 'safe range' of the capacitance detector 108, the detector 108 will stop sending the required signal to the electrically isolated switch 112. This in turn will open or interrupt the circuit between the thermostat and the appliance 26. The capacitance will alter if a joint becomes separated or if there is a corrosion penetration between the two or more isolated conductive layers 53 and 56 being used in the conduit 22 to produce the capacitance. The range of the 'safe range' of the capacitance device can be altered by modifying the circuit parameters of memory set potentiometer 110.

Figure 7:
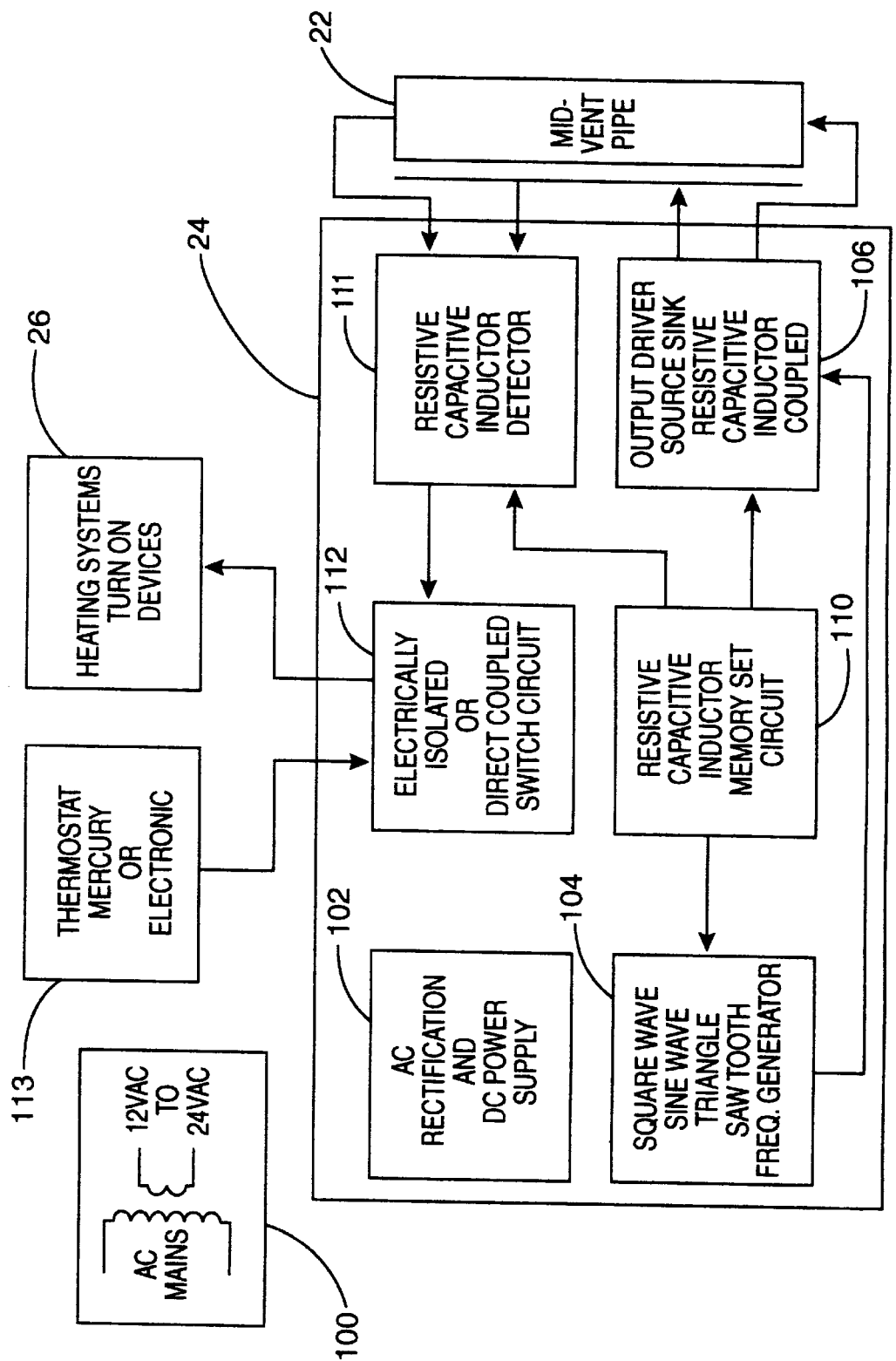
FIG. 7 is a block diagram of an alternate leak detection system in accordance with the present invention.

Alternatively, as depicted in the block diagram of FIG. 7, the electrically isolated switch 112 can be operated by detectors 111 which measure or electrical inductance of the conduit 22, to determine the variance from electrical properties of the conduit 22 when it was first installed which would indicate a joint separation or corrosion penetration. Various combinations of detectors 108 and 111 can be used simultaneously or separately as long as the conduit 22 is used as a vital and reactive component and not as an electrically passive circuit element.

Figure 8:
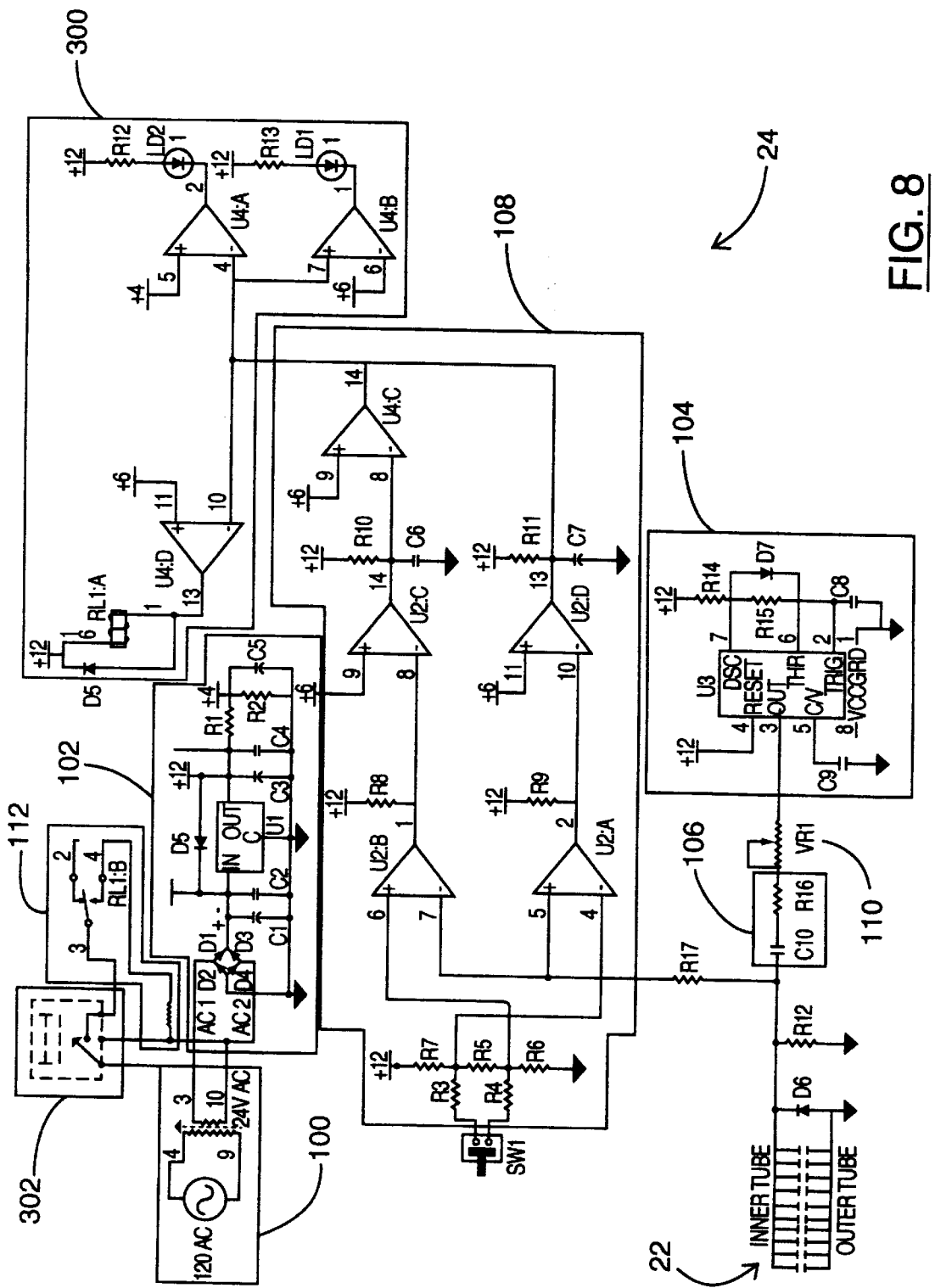
FIG. 8 is a circuit diagram of the control device for the leak detection system of FIG. 1.

Referring to FIG. 8, a circuit diagram for the control device 24 depicted in FIG. 6 is shown. The transformer 100 provides for the conversion of a 120 volt AC signal from the appliance 26 power source into an 24 volt AC signal which is then rectified using the AC rectifier 102. The AC rectifier 102 is conventionally known and comprises a diode bridge (using diodes D1, D2, D3 and D4), diode D5, high buffer capacitance U1, various capacitors C1, C2, C3, C4, C5 and resistors R1 and R2. The diode bridge and rectifying diode D5, are configured, and the values of capacitors C1, C2, C3, C4, C5 and resistors R1 and R2, are set in a conventionally known manner, such that rectified 6 and 12 volt DC signals are produced by the AC rectifier 102 to power the various components of the control device 24.

The frequency generator 104 comprises an integrated oscillating circuit U3 and configuring resistors R14, R15, capacitors C8, C9 and diode D7 which are configured and adapted to produce an output square wave voltage signal (hereinafter "square wave signal") at pin 3. This square wave signal is inputted into the potentiometer 110 which comprises a variable resistor VR1 which can be manually adjusted to modulate the amplitude of the generated square wave signal. The generated signal is then passed through resistor R16 and capacitor C10 to provide a high pass filtered DC square wave signal for input into the conduit 22.

As discussed above, the conduit 22 comprises a first conductive layer 53 and a second conductive layer 56 which are separated by an insulator layer 54. The second conductive layer 56 is grounded and the first conductive layer 53 receives the modulated square wave signal. Diode D6, coupled between the first and second conductive layers 53 and 56 together with grounded resistor R12 act as a simple protection circuit to protect the system 20 from improper application of reverse polarity power leads or power surges.

Capacitance detector circuit 108 provides a predetermined 'safe range' for system operation. Using resistors R5, R6 and R7 in a well known voltage divider configuration with a 12 volt DC source, capacitance detector circuit 108 provides its comparators U2:A and U2:B with predetermined voltage signals. Specifically, a high reference signal will be provided to node 4 of U2:A and a low reference signal will be provided to node 6 of U2:B.

Capacitance detector circuit 108 also comprises comparators U2:A, U2:B, U2:C, U2:D, and U4:C which are used along with resistors R8, R9, R10, R11 and capacitors C6 and C7 to compare the specific peak to peak or amplitude value of the output voltage signal (hereinafter "conduit 22 signal") from the conduit 22 with the preset 'safe range' established by resistors R5, R6 and R7. The amplitude of the output triangle wave signal of conduit 22 will be compared with the predetermined amplitude 'safe range' and comparators U2:D and U4:C will output a high voltage signal to a user alert and relay switch control 300 to indicate whether or not the conduit 22 is operating within the 'safe range'.

Capacitance detector circuit 108 provides detection of the output signal from the conduit 22 in the following manner. As discussed above, resistors R5, R6 and R7 provide high and low reference signals to nodes 4 and 6 of comparators U2:A and U2:B, respectively which together define a particular 'safe range' of operation for the system. Comparators U2:A and U2:B are used with resistors R8 and R9 in a conventional manner to compare the signal from the conduit 22 with their input reference signal and to output the differences. The signals representing these differences are then input into nodes 8 and 10 of comparators U2:C and U2:D configured with resistors R10 and R11 and capacitors C7 and C8, to provide a filtered noise-free inverted signal. Node 14 of U2:C is then inverted again through U4:C.

Since U2:A is comparing the conduit 22 signal with a high reference signal at node 4, if the conduit 22 signal is lower than the high reference signal (normal operation), the output will be a low voltage. This will be inverted through U2:D such that a noise-free high voltage will result, indicating normal operation. Accordingly, when the conduit 22 signal is higher than the high reference signal, the output of U2:A will be high and the output of U2:D will be low, indicating fault conditions. Similarly, since U2:B is comparing the conduit 22 signal with a low reference signal at node 6, if the conduit 22 signal is higher than the low reference signal (normal operation), the output will be a high voltage. This will be inverted through U2:C for a noise-free low voltage and then re-inverted through U4:C for a high voltage at node 14 of U4:C, indicating normal operation. When the conduit 22 signal is lower than the low reference signal then the output of U2:B will be low, the output of U2:C high, and the output of U4:C low, indicating fault conditions. In this way the capacitance detector circuit 108 ensures that any conduit 22 signal which is either lower than the low reference signal or higher than the high reference signal (fault conditions) produces a low voltage signal at either node 13 of U2:D or node 14 of U4:C and otherwise produces a high voltage signal (normal conditions).

Calibration of the control device 24 for a particular installation is achieved by depressing switch SW1 while operating the system and adjusting variable resistor VR1 until the green LED LD1 lights. While switch SW1 is depressed, resistors R3 and R4 are included in parallel with resistor R5 resulting in a lower resistance value between nodes 6 and 4 of comparators U2:B and U2:A respectively. Consequently, the voltage difference between nodes 6 and 4 will be reduced. The resulting narrowed voltage range will cause the capacitance detector circuit 108 to operate in a narrower 'safe range' during the calibration period. Variable resistor VR1 will then be adjusted until green LED LD1 just lights indicating that the system has an amplitude level just slightly less than the reference signal. When switch SW1 is released, the resistance value between nodes 6 and 4 increases and consequently the voltage difference between nodes 6 and 4 increases widening the 'safe range' window. This procedure is a well known way of ensuring that the calibrated system will normally operate approximately in the center of the preset 'safe range'.

Once the control device 24 is calibrated and operational, any changes in the capacitance of the conduit 22 will be monitored by capacitance detector circuit 108 and user alert and relay switch control 300 will be enabled when the system operates outside the preset 'safe range'. As shown, node 14 of comparator U4:C is connected to nodes 4, 7 and 10 of the alerting and control module 300. While the system operates within the preset 'safe range', node 14 will carry a high voltage which will trigger comparator U4:B to enable green LED LD1 to indicate normal safe operation. Any change in the capacitance of the conduit 22 which causes the system to operate outside the preset 'safe range' will be detected by the capacitance detector circuit 108. Once such operation is detected, node 14 will carry a low voltage such that comparator U4:A will turn on red LED LD2 to alert the user that the system has detected a fault. Further when node 14 is low, the comparator U4:D will activate the relay coil RL1:A which energizes an appliance switch RL1:B to turn the appliance off.

Electrically isolated switch RL1:B is isolated electrically from the rest of the circuit through inductor L1. A thermostat 302 for the appliance 26 is coupled to electrically isolated switch 112. Thermostat 302 is also coupled between the output of transformer 100 and the input of AC rectifier 102. When relay coil RL1:A is not activated by capacitance detector circuit 108, electrically isolated switch 112 and thermostat 300 will function normally. When relay coil RL1:A is activated to energize electrically isolated switch 112, and thus when the 'safe range' has been exceeded, the circuit between thermostat 302 and the appliance 26 will be opened and the thermostat 302 will be disconnected from the appliance 26.

Alternate Conduit Embodiments (a) Chimney Liner (not shown)

A conventional aluminum or steel flexible corrugated chimney liner (not shown) may also be used in the leak detection system 20 of the present invention to conduct flue gasses from the appliance 26 to the outside of the building 34. The flexible metal conduit 22 acts as one of the two electrically conductive layers 53 and 56 required to create capacitance. An electrically conductive wire may be connected to the metal conduit 22 by means of either an electrically conductive epoxy or a metal clamp. Approximately two inches from the end of the tube the wire is insulated and the insulated length is long enough so that the wire may be attached to the control device 24.

The conduit 22 is then coated on the inside and outside as described previously with a insulator layer 54 of protective acid coating such as, but not limited to, plastisol, plastic, flouroelastomere or glass. Once the coating is cured, a layer 56 of electrically conductive material such as, but not limited to, aluminum foil, copper foil, electrically conductive epoxy, electrically conductive graphite paint, or electrically conductive flouroelastomere etc. is applied to the exterior of the conduit 22 as described earlier. This layer acts as the second electrically conductive layer 56 required to create capacitance. An electrically conductive wire 70 is stripped of insulation at one end and that end attached to the second electrically conductive layer 56 by means of electrically conductive epoxy or metal clamps. The other end of the insulated wire is then connected to the proper terminal located in the control device 24.

Because the flexible conduit 22 is continuous (no individual interconnected sections), there is no requirement to electronically connect the respective first and second conductive layers together end to end.

Alternatively, the metal strips which are used to fabricate conventional chimney liners can be precoated with a protective and electrically insulating material prior to being fed through the fabricating equipment normally used to form conventional chimney liners. By feeding the two coated layers simultaneously through the conventional fabricating equipment, the two electrically conductive layers needed to form capacitance described above will be formed in a single operation using this method.

(b) Plastic Conduits

Figure 9:
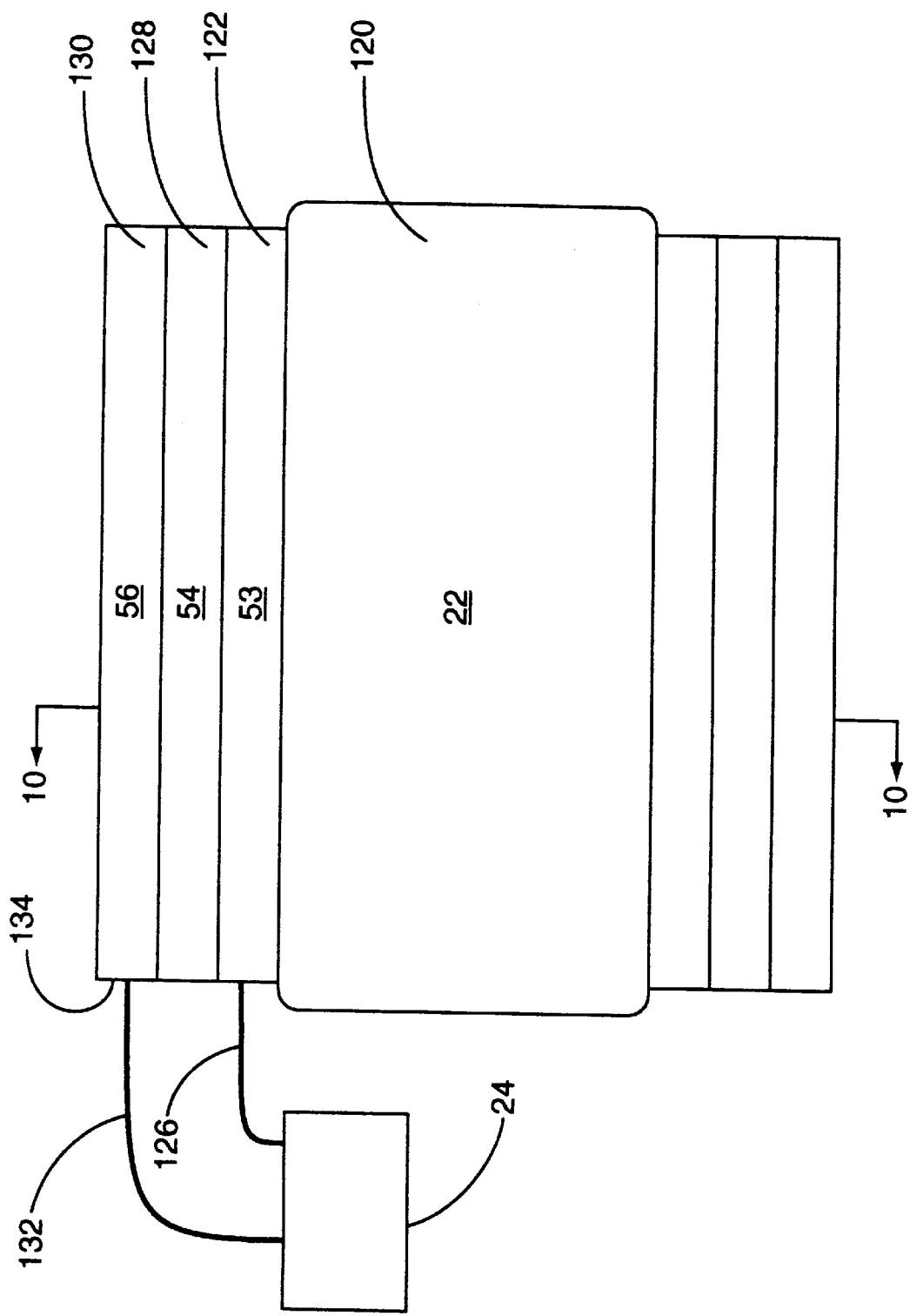
FIG. 9 is a plan view of an alternate conduit section for a leak detection system in accordance with the present invention.
Figure 10:
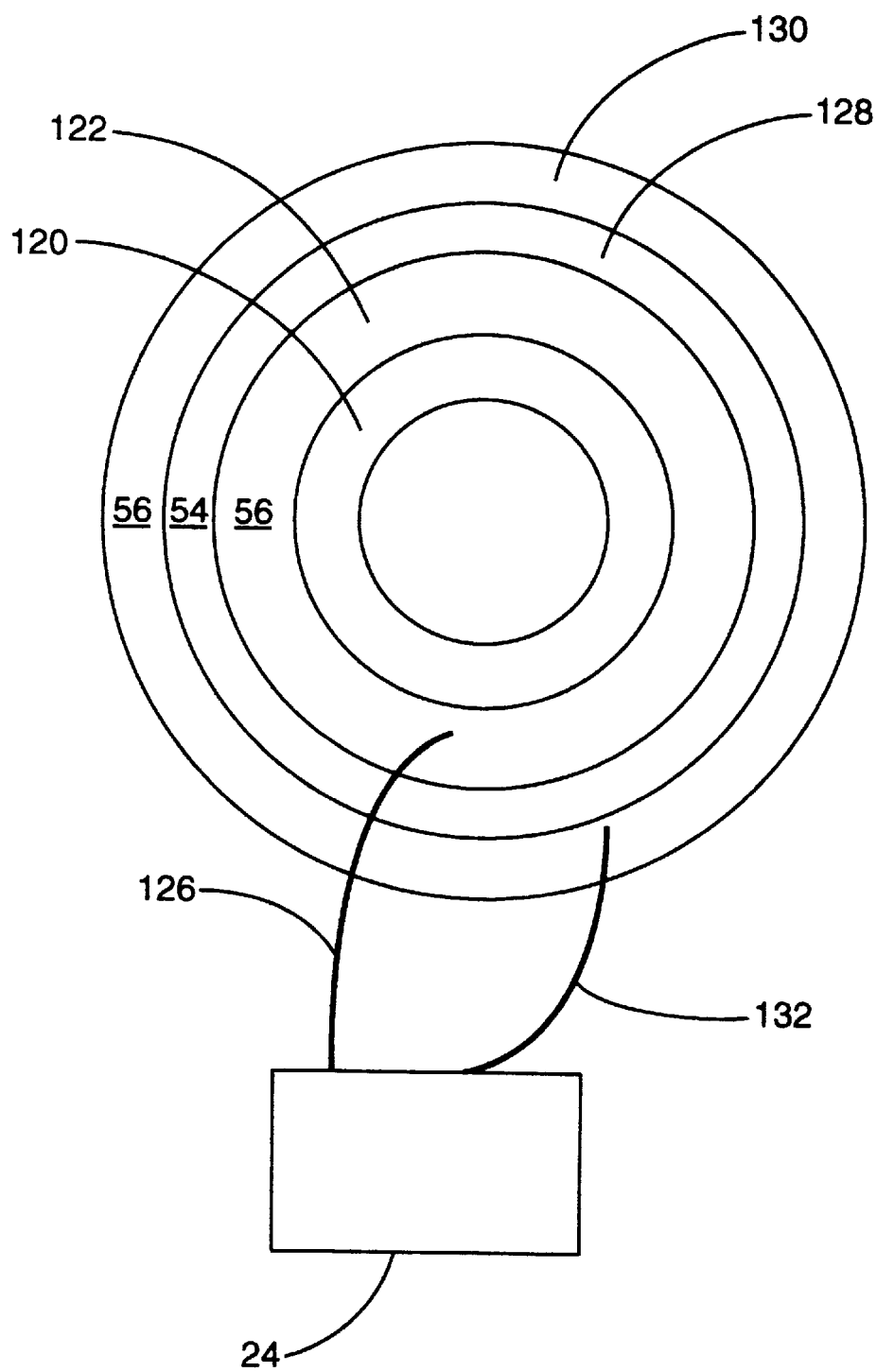
FIG. 10 is a sectional view of the conduit section of FIG. 9 taken along lines 10—10.

Referring to FIGS. 9 and 10, conventional conduit 22 such as a high temperature plastic vent pipe 120 can have additional corrosion protection and mechanical strength by applying a layer such as, but not limited to, flouroelastomere coating 122 to the exterior of the existing plastic conduit 22. The coating can either be sprayed on or brushed on and left to dry until it is cured. The coating must have the ability to expand and contract at least as much as the plastic conduit 22 which it is protecting to avoid constricting the conduit 22 and causing stress cracks.

In order to have electronic control protection for the conduit 22 there must be at least two layers 53 and 56 of electrically conductive materials which are separated by layers of non-electrically conductive materials 54. The first layer 122 added to the plastic vent can serve as one of the two layers required to create electrical capacitance if the coating is electrically conductive. For instance by adding graphite or metal powder to the flouroelastomere coating 122, the coating itself will become a first electrically conductive layer 53. This electrically conductive layer 53 must cover the entire length of the conduit 22.

A stripped electrical wire 126 must be connected to the first conductive layer 53 in such a way as to provide a good electrical connection between conduit sections 36. This can be accomplished in many different ways such as wrapping the exposed wire 126 around the conduit 120 while the conductive flouroelastomere coating 122 is still wet so that when the coating cures the coating itself makes a strong bond to the wire 126. The remainder of the wire 126 should be insulated and of sufficient length to reach the control device 24.

The second layer of coating 128 must be an insulator layer 54. This layer must electrically insulate the entire length of conduit 22. If the coating is not continuous a second layer of electrically conductive coating 56 will short out through to the first electrically conductive layer 53 which will interfere with the ability of the control device 24 to properly read the capacitance of the entire conduit system. The second layer 54 can be, but not limited to, a layer of a non-electrically conductive flouroelastomere.

A third layer of coating 130 must again be an electrically conductive layer which will serve as the second conductive layer 56 required to create electrical capacitance. This can be, but not limited to, either another layer of electrically conductive flouroelastomere 130 or metal foil tape such as, but not limited to, adhesive backed aluminum tape as described previously.

An electrical wire 132 with the insulation stripped from one end must be attached to the second conductive layer 56. This is done by means of, but not limited to, an electrically conductive epoxy 134 or a metal gear clamp. The remainder of the wire will have the insulation still in place and must extend to the electronic control device 24.

(c) Heat Exchangers (not shown)

Heat exchangers are basically a conduit 22 which allow hot flue gases, liquids, or air to pass through the conduit 22 or heat exchanger in close proximity to the medium which is intended to receive the energy. The hot liquid, gas, or air is separated from the medium which is to be heated by a thermally conductive conduit 22 used to achieve the exchange of energy. If this thermally conductive conduit 22 is constructed of two or more electrically conductive layers 53 and 56 which are separated from each other by an insulator layer 54 then the conduit 22 can act as a capacitor as long as the electrically conductive layers 53 and 56 are in close proximity to each other. The control device 24 described above can then monitor the capacitance, inductance or resistance (or a direct short if given a high enough voltage) of the conduit 22 or heat exchanger and interrupt the operation of the equipment in the event of corrosion as described above.

(d) Containers (not shown)

Fluid storage and processing containers can also be made to function as a capacitor if the walls of the containers are made of two electrically conductive layers 53 and 56 of material separated by an insulator layer 54 as long as the electrically conductive layers 53 and 56 are in sufficient proximity to each other. By using the above described electronic detection techniques the control device 24 can monitor the tank for corrosion or leaks.

(e) B-Vent

Figure 11:
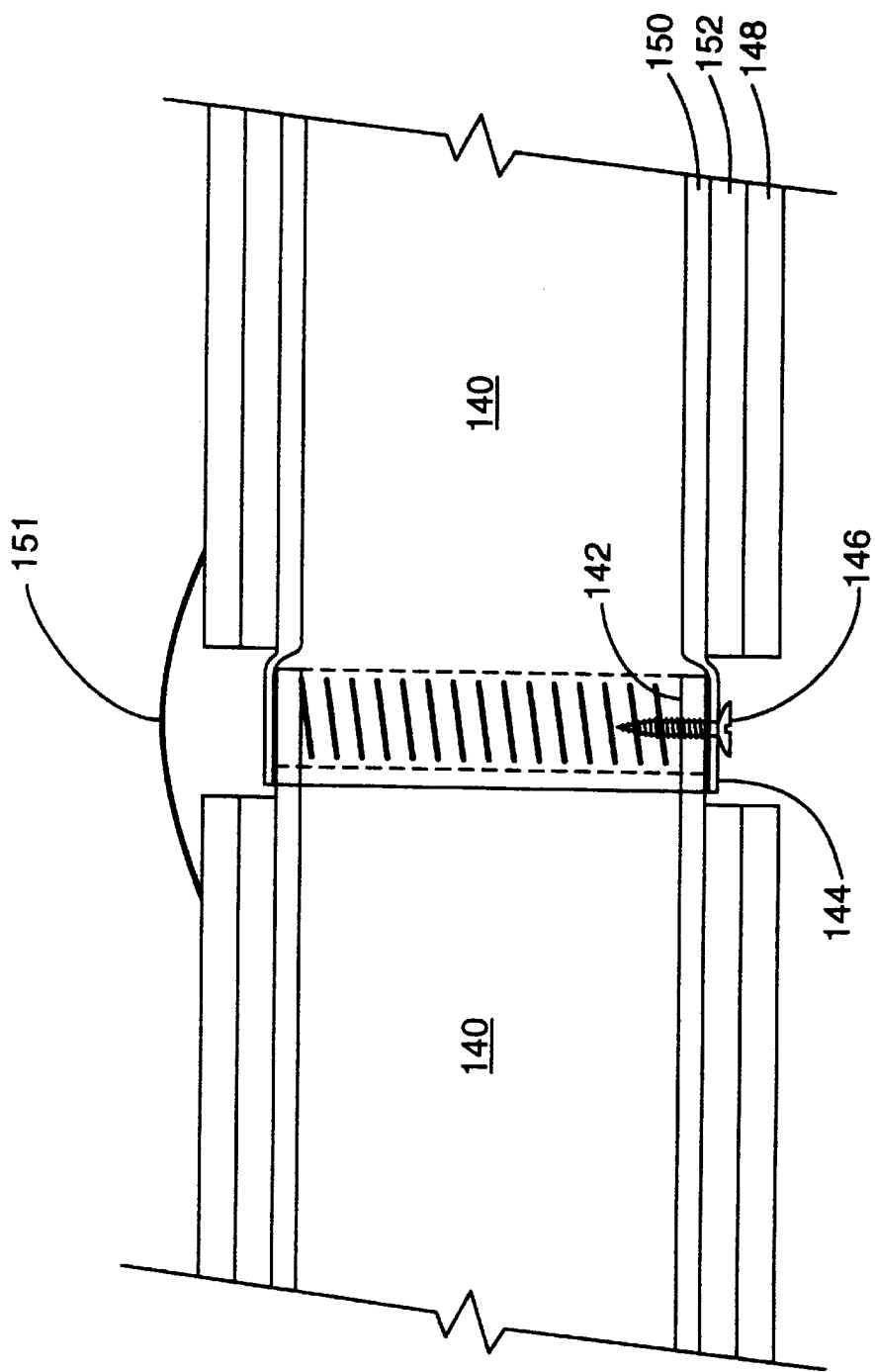
FIG. 11 is a longitudinal sectional view of a conduit section incorporating an alternate leak detection system in accordance with the present invention.

Conventional B vent consists of a double walled metal conduit 22 which exhausts the flue gases from an appliance generally vertically through the roof of a building 34. As shown in FIG. 11, the sections of B vent 140 are connected by inserting a male shaped end 142 into a female shaped end 144 and then a self tapping screw 146 is used to penetrate the over lapped area between the two sections of B vent 140 so that the two sections cannot come apart. Either the interior wall or the exterior wall of the B vent 140 can act as a capacitor if the walls are constructed of two or more electrically conductive layers 53 and 56 which are separated by a insulator layer 54 but are located in close proximity. The screw 146 electrically connects the first layers 53 of adjacent sections 36. A wire 151 is provided to electrically connect the second layers 56 as described above.

Alternate Monitoring Means (a) Arc Monitoring

If the voltage is high enough to allow enough current to flow between two layers 53 and 56 of electrically conductive materials which are separated with a layer 54 of an insulator material then the current will be able to blow an electrical fuse. The amount of voltage required depends on the resistance of the condensate or corrosive liquid and the distance that the condensate or liquid must carry the current. In this situation the conduit 22 actually becomes an integral part of the overall detection system being used as part of the electrical circuit connected to the fuse.

(b) Interrupt Monitoring

Figure 12:
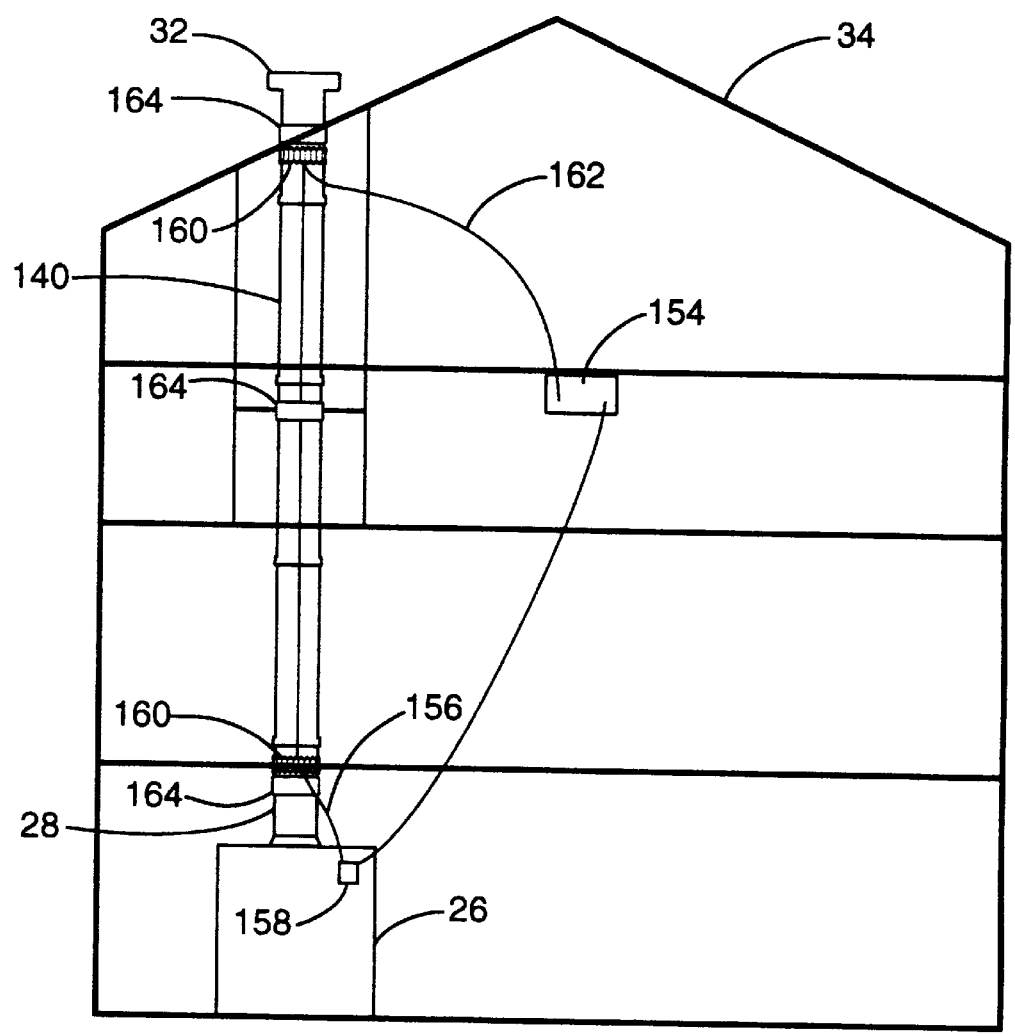
FIG. 12 is a side view of a building with a vertical conduit incorporating an alternate leak detection system in accordance with the present invention.

FIG. 12 depicts a conduit 22 which is constructed of an electrically conductive material such as, but not limited to B vent 140, to be incorporated as part of an electrical circuit connecting the appliance 26 to a thermostat 154. A wire 156 leads from a conventional power source 158 of the appliance to either the appliance adaptor 28 or the first section of conduit 22 closest to the appliance. At this point, a secure electrical connection is made with the first conduit 22 section using a ring crimp connector 160 or the like secured to the conduit 22 by means of a pop rivet or a gear clamp with a solderless connector attached to the gear clamp.

Between the adapter 28 and the exterior of the building 34 are many sections of conduit 22. These electrically conductive sections of pipe are held together by screws or electrically conductive clamping systems. This enables the entire conduit 22 to carry an electrical current. An electric wire 162 is attached to the final section of vent pipe (which extends beyond the exterior of the structure) by the same means as described above. This wire 162 is then connected to the thermostat 154. By incorporating the conduit 22 as part of the circuit leading between the appliance 26 and the thermostat 154, if the conduit 22 separates sufficiently to interrupt the flow of current, the appliance 26 will not be able to function.

The above venting system cannot be attached directly to the appliance without an insulated barrier 164 separating the appliance 26 from the conduit 22 as the appliance 26 is grounded and this contact would ground out the electrical circuit and make the system inoperable. In addition, all support plates and roof caps (not shown) must be insulated in such a way as to prevent grounding.

Figure 13:
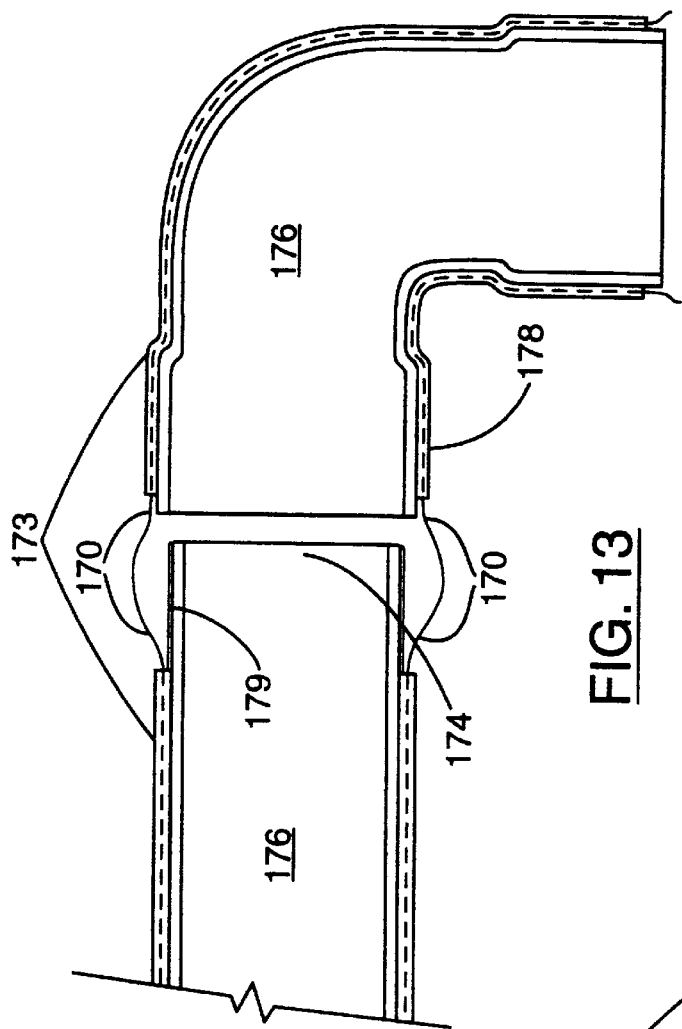
FIG. 13 is a sectional view of two conduit sections for an alternate leak detection system in accordance with the present invention.
Figure 14:
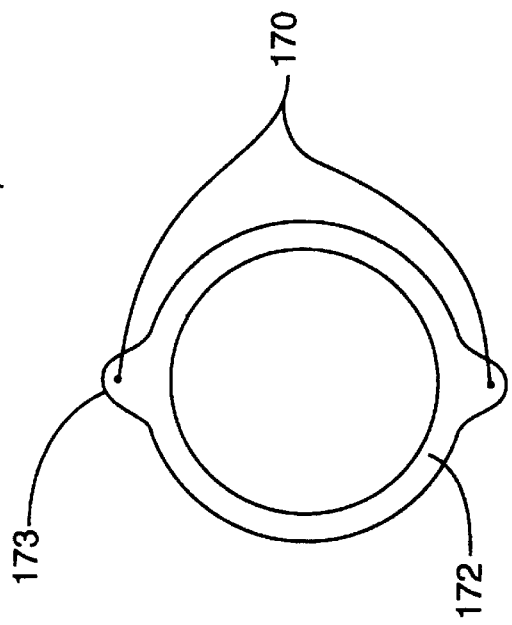
FIG. 14 is an end view of one of the conduit sections of FIG. 13.

A method of utilizing the conduit 22 as a part of the circuit between the appliance 26 and thermostat 154 for plastic conduits is shown in FIGS. 13 and 14. A conductive wire 170 is embedded in the plastic conduit 172 at the time of manufacturing with the ability to expose the wire at each end of the conduit sections 36.

During installation, the male end 174 of a conduit section 176 is inserted into the female end 178 of a conduit section 176 and secured with epoxy (not shown) or other type of glue. The surrounding plastic insulation 173 for the embedded wire would be cut back at the male and female ends 174, 178 so that the portion of the male end of pipe which will overlap inside of the female joint section will have a flush surface as indicated at 179. This flush surface will allow the male end to be inserted into the female joint.

The joints will be molded with wire embedded into the sides in such a manner that there is exposed wire available at the ends of the joint to be connected with the exposed wires at the ends of the straight male ends 38. The exposed wires at the ends of the straight sections 42 and the joints are connected by means of a crimp connector (not shown) so that a continuous circuit is completed between straight sections 42 and joints.

The length of non-insulated wire should not be long enough to allow the pipe joint to completely separate without either breaking the wire or pulling the wire out of the crimp connector. Accordingly, a separated section of pipe will cause an interruption of the current in the conduit 22.

Similar to the arrangement depicted in FIG. 12, the wires located adjacent the appliance and the wall thimble 30 can be connected to form a circuit with the appliance power source 158 and the thermostat 154.

If a section were to separate in the vent pipe and break the electrical connection between the sections of pipe then the circuit between the appliance and the thermostat 154 would also be broken and the appliance would be prevented from cycling on.

Figure 15:
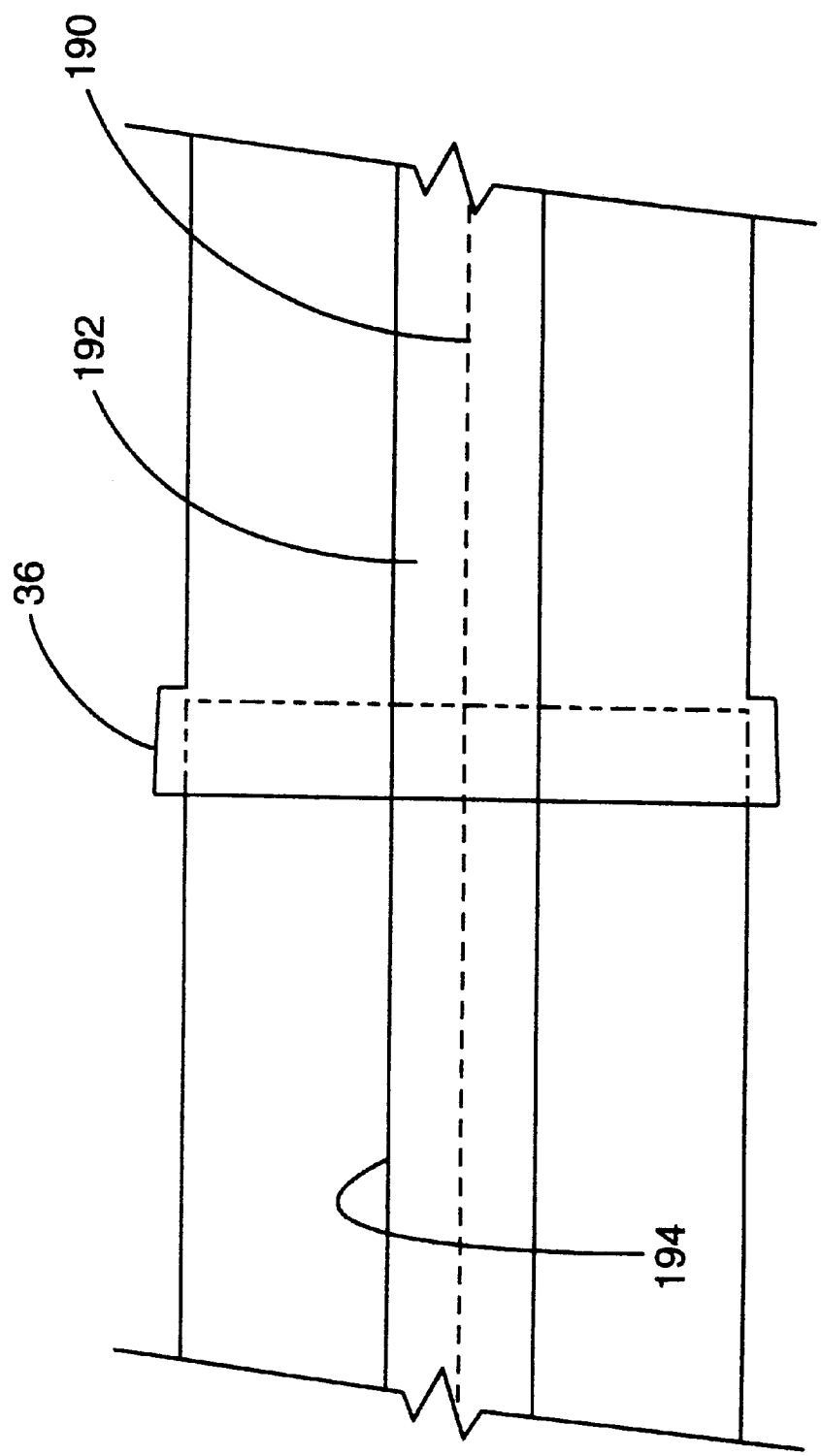
FIG. 15 is a partial plan view of two connected conduit sections for an alternate leak detection system in accordance with the present invention.

Referring to FIG. 15, another means for detecting joint separation comprises an electrically conductive wire 190 that is molded into a plastic or rubber extrusion or tape 192 with an adhesive backing 194 applied to one side of the extrusion. The tape or extrusion can then be adhered to the exterior of the entire length of the conduit ensuring that the wire and tape 192 is tight. This tape 192 would be applied on the sides of the entire venting system. The wire 190 embedded in the tape 192 will then be connected into the circuit leading from the appliance 26 to the thermostat 154 which controls the appliance. If the sections 36 of conduit separate, then the wire 190 inside of the tape or extrusion will be broken thus interrupting the current flow between the appliance 26 and the thermostat 154 and preventing the thermostat 154 from signalling the appliance 26 to come on.

Figure 16:
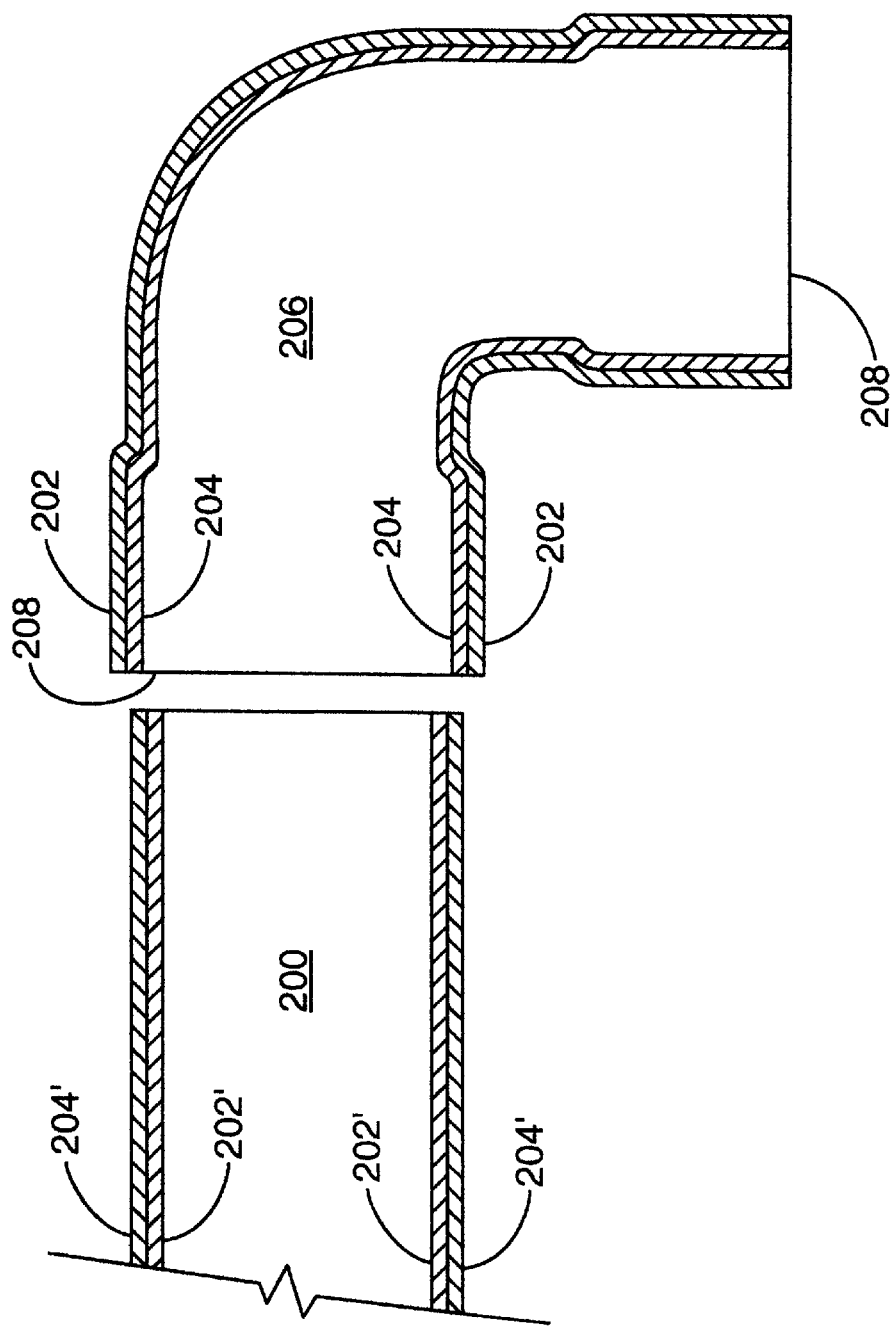
FIG. 16 is a partial sectional view of two connected conduit sections for an alternate leak detection system in accordance with the present invention.

Referring to FIG. 16, another method for detecting joint separation utilizes an extruded conduit 200 such as PVC pipe. During manufacture, the conduit 200 is extruded with two co-axial layers 202 and 204. The first co-axial layer 202 is a conventional extrusion material, such as PVC plastic. The second layer 204 is an electrically conductive material, such as a flouroelastomere or the like. The electrically conductive material is extruded to form the inner or outer surface of the conduit 200. The conduit 200 would be cut to size during installation and fastened to additional conduits using a coupler 206. The coupler 206 is similarly formed as a co-axial extrusion and includes enlarged female ends 208 for receiving the conduit 200. The coupler 206 may be formed in a variety of shapes, including a straight coupler (not shown) or a bent coupler 206 as depicted in the figure. The coupler 206 is formed such that its conductive layer 204 is opposite to the conductive layer 204 for the conduit 200. Accordingly, if the outer surface of the conduit 200 comprises the conductive layer 204, then the inner surface of the coupler 206 comprises the conductive layer 204. In this way, when the conduit 200 and coupler pieces are interconnected, a continuous conductive layer is formed along the length of the interconnected conduits for facilitating a flow of electric current from one end of the conduit 200 to the other. The entire conduit 200 may then be incorporated into an electric circuit as described above.

It is to be understood that what has been described is a preferred embodiment to the invention. If the invention nonetheless is susceptible to certain changes and alternative embodiments fully comprehended by the spirit of the invention as described above, and the scope of the claims set out below.

I claim:

1. A leak detection system for an elongate body, said leak detection system comprising:
   (a) first and second electrically conductive layers separated by an insulative layer, one of said first and second conductive layers defining said body and the other of said first and second conductive layers being disposed about a substantial portion of the perimeter of a transverse cross section of said body;
   (b) a circuit coupled to said first and second conductive layers for determining changes in capacitance between said first and second layers, said circuit comprising:
      (i) an oscillating circuit coupled to said first and second conductive layers for providing a first AC voltage signal
      (ii) an integrating circuit to said oscillating circuit and to said first and second conductive layers for producing a second AC voltage signal which is an integrated product of the first AC voltage signal;
      (iii) a detection circuit coupled to said integrating circuit for detecting the peak to peak amplitude of the second AC voltage signal produced by said integrating circuit; and
      (iv) a response circuit coupled to said detection circuit for triggering a predetermined response when the peak to peak amplitude of said second AC voltage signal produced by said integrating circuit exceeds a predetermined value.

2. A leak detection system as claimed in claim 1, wherein said first conductive layer comprises a preformed metal conduit.

3. A leak detection system as claimed in claim 1, wherein said second conductive layer comprises metallic foil.

4. A leak detection system as claimed in claim 1, wherein said insulative layer is acid resistant.

5. A leak detection system as claimed in claim 1, wherein said body comprises a plurality of interconnected capacitive sections, and further comprising first connectors for electrically connecting said first conductive layer of adjacent capacitive sections and second connectors for electrically connecting said second conductive layer of adjacent capacitive sections.

6. A leak detection system as claimed in claim 1, wherein said oscillating circuit generates a square wave AC voltage signal such that a substantially triangular voltage signal is produced by said integrating circuit.

7. A leak detection system as claimed in claim 1, wherein said integrating circuit comprises a resistor capacitance network having at least one resistor and at least one capacitor.

* * * * *